July 15, 1952  K. F. WILLIAMS  2,603,051
WEED-CUTTING APPARATUS
Filed Sept. 19, 1949
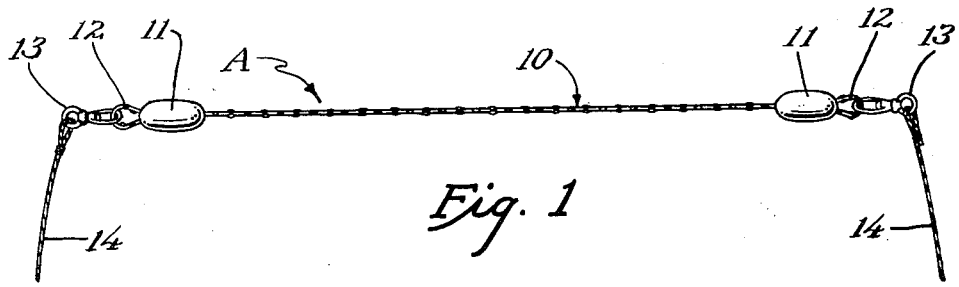
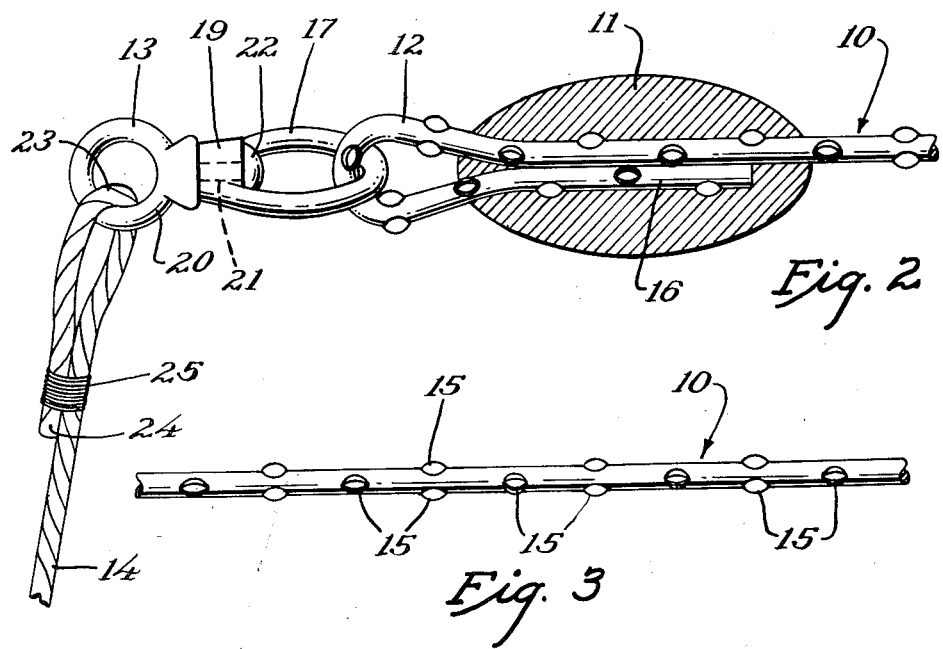
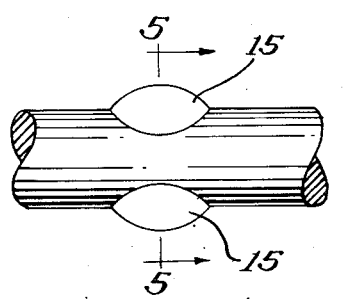
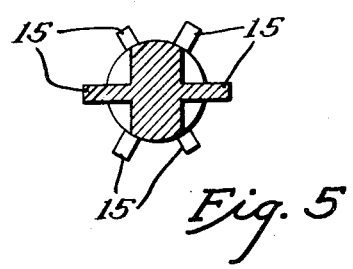
INVENTOR.
Kenneth F. Williams
BY
Robert M. Dunning
ATTY.

Patented July 15, 1952

2,603,051

UNITED STATES PATENT OFFICE 2,603,051

WEED-CUTTING APPARATUS

Kenneth F. Williams, St. Paul, Minn.

Application September 19, 1949, Serial No. 116,604

1 Claim. (Cl. 56—8)

My invention relates to an improvement in weed cutting apparatus wherein it is desired to provide a simple and effective means of cutting off weeds and under-water growth close to the bottom of a body of water.

Many swimming beaches are destroyed by an under-water growth of weeds, reeds and other such plants. These weeds and reeds are difficult to remove, and often render a bathing beach unfit to use or unsafe to use. Various means have been provided for cutting down under-water growth close to the bottom of the water, but such means are usually extremely expensive and difficult to operate.

It is an object of the present invention to provide a simple and effective device for cutting down weeds, reeds and the like close to the bottom of a body of water. This device may be used by merely drawing the device along the bottom of the lake, pool, or stream. If the device is of short length it may be operated by a single person pulling upon ropes or cords at opposite ends of the device. Preferably, however, the device is operated by two persons in spaced relation, each pulling one end of the apparatus.

A feature of the present invention lies in the provision of an elongated rod capable of cutting weeds, reeds and the like beneath the surface of the water and in providing a weight at each end of this device which holds the same on or near the bottom of the body of water. As a result the growth is cut off near the roots and will float to the surface where it can be collected or allowed to float away.

A feature of the present invention resides in the provision of an elongated rod capable of cutting under-water growth, in providing a weight at each end of the rod, and in connecting the rod to towing cables through a swivel connection. As a result rotation of the rod will not tangle the rope by means of which the rod is being moved.

A feature of the present invention lies in the construction of the blade used for cutting the under-water growth. This blade does not include a series of spaced teeth such as are often used on knife blades, saws and similar instruments. My cutting blade comprises a round rod having a spaced series of rounded lips which will not catch in the underwater growth and move the same with the blade. The rounded projections have been found extremely advantageous for cutting the under-water growth and at the same time have the unusual characteristic of not catching or clinging to the growth after it has been cut. As a result the growth is free to float to the surface and the blade may be used for substantial periods of time and considerable distance without the necessity of lifting the blade to the surface of the water and removing growth therefrom.

A feature of the present invention lies in the provision of an elongated rod having rounded projections which are arranged in angularly spaced relation about the periphery of the rod. In view of the fact that the rod is free to rotate about its axis in operation, I provide a plurality of rows of angularly spaced teeth in the form of rounded projections which are capable of cutting down the growth regardless of the angular position of the rod.

These and other objects and novel features of the present invention will be more clearly and fully set forth in the following specification and claim.

In the drawings forming a part of my specification:

Figure 1 is a plan view of my blade in readiness for operation.

Figure 2 is an enlarged view of one end of the blade showing the weight thereupon in section.

Figure 3 is a detailed view of a portion of the blade.

Figure 4 is a plan view of a pair of teeth on the blade showing the manner in which they are constructed.

Figure 5 is a sectional view on the line 5—5 of Figure 4 showing the cross sectional shape of the blade at the point of a pair of opposed teeth or projections.

The weed cutting apparatus is indicated in general by the numeral A. This apparatus includes a weed cutting blade or element 10 which is preferably weighted at each end. As shown in Figure 1 of the drawings, the weed cutting blade 10 is provided with a weight 11 at each end thereof. The end of the blade 10 is preferably looped as indicated at 12. A swivel 13 is connected to each end loop 12. A flexible cord or cable 14 is connected to each swivel 13 by means of which the blade 10 may be moved along the floor of the body of water to cut off the weeds and other growth at this point.

The blade 10 is formed as best illustrated in Figures 3, 4 and 5 of the drawings. As shown in Figure 3 the blade is generally cylindrical in form and is provided with rounded projections 15 at longitudinally spaced points along the length of the blade. These projections 15 are widest at their center as indicated in Figure 4 of the drawings.

The projections or teeth 15 are usually formed by stamping a portion of the cylindrical rod forming the blade 10 so as to produce flat projecting ears. The portion of the rod pressed together causes a rounded projection which blends into the body of the rod at opposite ends and which widens the blade substantially at its mid-point. Usually the projections 15 are diametrically opposed as indicated in Figures 4 and 5 of the drawings.

As indicated in Figure 5 of the drawings the teeth or projections 15 are located at angularly spaced points about the circumference of the cylindrical rod. In other words, pairs of ears project from the surface of the rod along planes through the axis of the rod which are angularly related to one another. In the specific form of construction illustrated in Figure 5 the planes of the teeth or projections are spaced sixty degrees apart. Obviously the angular spacing between the teeth may be varied particularly with a variation in the diameter of the rod.

As shown in Figure 2 of the drawings each end of the rod 10 is bent to form a loop, the extremity 16 of the rod lying in parallel relation to the body of the rod at the base of the loop. The weight 11 is preferably cast over the parallel portions of the rod to enclose a portion of the rod 10 at the base of the loop 12 and also to enclose the extremity 16. Thus the weight may provide a means of closing the looped ends of the blade and at the same time forming a weight at each end of the blade.

The swivel 13 may be of any suitable shape or size and is shown as including a loop 17 linked into the loop 12 in any suitable manner and having a radially extending bearing 19 at one end thereof. The other portion of the swivel includes a ring 20 having a shank 21 extending radially therefrom. This shank 21 extends through the bearing 19 and is riveted or upset to form a head 22. The shank 21 may pivot with the bearing 19, thus forming a means for relative rotation between the loops 17 and 20.

The cord or cable 14 extends through the swivel loop 20 and is tied or fastened in any convenient manner. In Figure 2 of the drawings the cable 14 is shown bent at 23 to form a loop and having an extremity 24 extending in parallel relation to the body of the cable 14. Wire or other binding means 25 encircles the body of the cable 14 and the end 24 to tie these elements together to form a loop extending through the eye 20.

The weed cutting apparatus is drawn along the bottom of the body of water, the weights 11 and the weight of the blade and swivels holding the device on the bottom. The cables 14 are drawn to pull the blade laterally through the weeds or other growth. Preferably the cables 14 are held at an acute angle to the blade 10 so that a see saw or endwise movement may be imparted to the blade as it is moved along the bottom of the water. The projections 15 cut into the weeds and cut them off near the bottom of the body of water, the weeds then rising to the the surface where they may be collected or allowed to float away. While the teeth or projections are round in shape, they are extremely effective in cutting down under-water growth and have the advantage of not catching or clinging onto the weeds or other growth after it is cut.

Various types of blades have been employed in a somewhat similar manner, such blades being provided with teeth of various types of the general form of saw teeth or the like and other blades have been provided which are notched at spaced points to provide sharp indentations to cut the growth. I have found, however, that such blades usually wedge portions of the weeds or other growth between adjacent teeth and therefore gradually collect the weeds or growth until the blades must be raised and cleaned. With my device there is seldom any growth which collects on the blade so that the work may continue virtually without interruption.

In accordance with the patent statutes, I have described the principles of construction and operation of my weed cutting apparatus, and while I have endeavored to set forth the best embodiment thereof, I desire to have it understood that obvious changes may be made within the scope of the following claim without departing from the spirit of my invention.

I claim:

An apparatus for cutting submarine growth comprising a rod-like blade provided with a plurality of angularly and axially spaced rounded cutting teeth throughout the length thereof, the blade being reversely bent adjacent each end to form a pair of loops, a weight member embracing a portion of each loop, including the teeth thereon, to maintain the loops in looped configuration, and pulling means engaging each loop.

KENNETH F. WILLIAMS.

REFERENCES CITED

The following references are of record in the file of this patent:

UNITED STATES PATENTS

| Number | Name | Date |
|---|---|---|
| 868,958 | Ziemsen | Oct. 22, 1907 |
| 911,357 | Ziemsen | Feb. 2, 1909 |
| 1,897,820 | Pitchford | Feb. 14, 1933 |
| 2,317,367 | Foerster | Apr. 27, 1943 |

FOREIGN PATENTS

| Number | Country | Date |
|---|---|---|
| 25,533 | Sweden | Sept. 19, 1908 |
| 27,550 | Great Britain | Dec. 18, 1908 |